US010807411B2

(12) United States Patent
Perkins et al.

(10) Patent No.: US 10,807,411 B2
(45) Date of Patent: Oct. 20, 2020

(54) WHEEL WITH SPOKES INCLUDING INTEGRAL STEP PROVIDING IMPROVED ACCESS TO A CARGO BED OF A MOTOR VEHICLE

(71) Applicant: FORD GLOBAL TECHNOLOGIES, LLC, Dearborn, MI (US)

(72) Inventors: William Paul Perkins, Dearborn, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 554 days.

(21) Appl. No.: 14/684,809

(22) Filed: Apr. 13, 2015

(65) Prior Publication Data
US 2016/0297239 A1    Oct. 13, 2016

(51) Int. Cl.
| | | |
|---|---|---|
| *B60B 19/00* | (2006.01) | |
| *B60B 3/10* | (2006.01) | |
| *B60B 1/00* | (2006.01) | |
| *B60B 1/06* | (2006.01) | |

(52) U.S. Cl.
CPC ............... *B60B 19/00* (2013.01); *B60B 1/00* (2013.01); *B60B 1/06* (2013.01); *B60B 3/10* (2013.01); *B60B 2900/351* (2013.01)

(58) Field of Classification Search
CPC .... B60B 1/00; B60B 1/06; B60B 1/08; B60B 1/12; B60B 3/00; B60B 3/10; B60B 5/02; B60R 3/00; B60R 3/04
USPC ..... 301/5.1, 64.101, 64.102, 64.704, 64.705, 301/6.3, 73, 79; 280/163, 164.1, 164.2, 280/165; D12/204, 206
See application file for complete search history.

(56) References Cited

U.S. PATENT DOCUMENTS

| | | | | |
|---|---|---|---|---|
| 449,264 | A | * | 3/1891 | Ford, Jr. .................. B60R 3/00 280/165 |
| 2,218,060 | A | | 10/1940 | Watson |
| 3,288,488 | A | * | 11/1966 | Shinn ....................... B60B 7/00 280/165 |
| 3,590,950 | A | | 7/1971 | Wilson |
| 4,440,411 | A | | 4/1984 | Hess |
| 4,763,392 | A | * | 8/1988 | Fogal ...................... B05D 7/16 152/513 |
| 5,634,694 | A | | 6/1997 | Murray et al. |
| D407,054 | S | * | 3/1999 | Kelley ....................... D12/209 |
| 6,042,194 | A | * | 3/2000 | Fitz ......................... B60B 1/10 29/894.34 |
| 6,869,150 | B2 | | 3/2005 | Ptasinski |

(Continued)

FOREIGN PATENT DOCUMENTS

CN      201998738      10/2011

OTHER PUBLICATIONS www.tacomaworld.com/threads/painted-stock-rims-with-black-spray-on-bedliner.108433; Aug. 15-16, 2010; pp. 1-14.*

(Continued)

*Primary Examiner* — Jason R Bellinger
(74) *Attorney, Agent, or Firm* — David Coppiellie; King & Schickli, PLLC

(57) ABSTRACT

A wheel is provided for a motor vehicle. The wheel includes a hub, a rim and a plurality of spokes that extend between the hub and the rim. At least one of the spokes includes an integral step having a slip resistant surface.

6 Claims, 4 Drawing Sheets

(56) References Cited

U.S. PATENT DOCUMENTS

| | | | |
|---|---|---|---|
| 6,997,519 B2* | 2/2006 | Fischbacher | B60B 3/165 301/35.621 |
| 8,038,164 B2 | 10/2011 | Stahl et al. | |
| 8,567,873 B2* | 10/2013 | Rider | B60B 1/08 301/105.1 |
| 8,833,865 B2* | 9/2014 | Niedermayer | B60B 21/00 301/51 |
| 8,926,025 B2* | 1/2015 | Fior | B60B 1/10 29/894.341 |
| 2002/0079667 A1* | 6/2002 | Pohill | B60R 3/002 280/163 |
| 2003/0201664 A1 | 10/2003 | Kolpasky | |
| 2005/0121970 A1* | 6/2005 | Adrian | B29C 33/76 301/64.702 |
| 2006/0181137 A1 | 8/2006 | Kolpasky et al. | |
| 2009/0236902 A1* | 9/2009 | Zibkoff | B60B 1/003 301/104 |
| 2010/0019468 A1* | 1/2010 | Price | B60R 3/02 280/165 |
| 2010/0244397 A1* | 9/2010 | Huang-Tsai | B60R 3/00 280/163 |
| 2011/0079981 A1* | 4/2011 | McFarlane | B60R 3/00 280/163 |
| 2011/0309670 A1* | 12/2011 | Taylor | B60B 3/10 301/64.101 |
| 2015/0061354 A1* | 3/2015 | Tanaka | B60B 3/005 301/64.101 |
| 2015/0224935 A1* | 8/2015 | Huebner | B60R 3/02 280/166 |

OTHER PUBLICATIONS www.tacomaworld.com/threads/spray-on-bedliner-on-my-stock-wheels.307168; Dec. 16, 2013 to Feb. 8, 2014; pp. 1-12.*

Internet Archive Wayback Machine; web.archive.org/20031218003510/http://duplicolor.anthonythomas.com/projects/howto_truckbed.html; Dec. 18, 2003; pp. 3.*

English machine translation for CN201998738.

* cited by examiner

US 10,807,411 B2

WHEEL WITH SPOKES INCLUDING INTEGRAL STEP PROVIDING IMPROVED ACCESS TO A CARGO BED OF A MOTOR VEHICLE

TECHNICAL FIELD

This document relates generally to the motor vehicle field and, more particularly, to a wheel incorporating spokes including an integral step which allows improved access to the cargo bed of a motor vehicle.

BACKGROUND

Motor vehicles equipped with a cargo bed provide the operator with a great deal of utility, allowing the operator to haul any number of different items. One way to increase operator satisfaction with such a vehicle is to provide a more convenient way to access those items held in the cargo bed. One such solution is disclosed in U.S. Pat. No. 3,590,950 to Wilson. That patent relates to a portable step that may be mounted to the wheel of a stationary vehicle. While useful for its intended purpose, this portable step is relatively bulky and must be stored in the vehicle when not in use. Further, it is relatively inconvenient to handle and use.

U.S. Pat. No. 4,440,411 to Hess discloses another possible solution in the form of a vehicle hub step. While useful for its intended purpose, this device is somewhat unsightly and tends to collect and hold dirt and debris including, particularly, mud from a job site.

Yet another solution is disclosed in U.S. Pat. No. 2,218,060 to Watson and published U.S. Patent Application 2003/0201664 to Kolpasky. Both of these documents disclose a wheel hub including a hinged step that may be flipped down for use and then flipped up into a storage position when not in use. Again, while useful for its intended purpose, this solution suffers a number of shortcomings. Such articulating/hinged mechanisms have moving parts that require customer action to use and are subject to the failure modes that occur with moving parts. Further, the mechanism is inherently imbalanced and, therefore, has the potential to create wheel rotational imbalance problems.

This document relates to a new and improved wheel for a motor vehicle that incorporates one or more spokes with an integral step having a slip resistant surface. Such an approach provides a more aesthetically pleasing, convenient and simple to use solution than previously found in the prior art in order to improve access to items stored in the cargo bed of a vehicle.

SUMMARY

In accordance with the purposes and benefits described herein, a wheel is provided for a motor vehicle. That wheel incorporates a hub, a rim and a plurality of spokes that extend between the hub and the rim. At least one spoke of the plurality of spokes includes an integral step having a slip resistant surface. That slip resistant surface yields an increased coefficient of friction with the sole of a shoe when one steps on that surface to gain a vertical advantage from ground level to allow one to better access items in a cargo bed of a motor vehicle or items carried on the roof of a motor vehicle.

In one possible embodiment, the slip resistant surface includes a raised lip. In one possible embodiment, the slip resistant surface includes a skid resistant liner. In one possible embodiment, the slip resistant surface includes a raised lip and a skid resistant liner.

In one possible embodiment, the slip resistant surface includes corrugations. In one possible embodiment, those corrugations are on a bias with respect to a front face of the spoke. Further, in one possible embodiment, those corrugations include a plurality of channels that direct airflow toward a vehicle brake assembly adjacent the wheel.

In accordance with an additional aspect, a motor vehicle is provided including the wheel described herein.

In accordance with yet another aspect, a method is provided for improving access to a cargo bed or rooftop of a motor vehicle. That method may be broadly described as comprising the step of equipping the motor vehicle with at least one wheel including a spoke wherein the spoke has an integral step with a slip resistant surface.

The method may be further described as including the step of providing a slip resistant surface with a raised lip. In another possible embodiment, the method includes the step of providing the slip resistant surface with a skid resistant liner. In yet another possible embodiment, the method includes the step of providing the slip resistant surface with a raised lip and a skid resistant liner.

In yet another possible embodiment, the method includes the step of providing the slip resistant surface with corrugations. In one possible embodiment, those corrugations are provided on a bias with respect to a front face of the spoke. In yet another possible embodiment, the method includes the step of directing air toward a brake assembly in the motor vehicle by means of air channels in the corrugations on the spoke of the wheel.

In the following description, there are shown and described several preferred embodiments of the wheel. As it should be realized, the wheel is capable of other, different embodiments and its several details are capable of modification in various, obvious aspects all without departing from the wheel as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the wheel and together with the description serve to explain certain principles thereof. In the drawing figures.

Reference will now be made in detail to the present preferred embodiments of the wheel, examples of which are illustrated in the accompanying drawing figures.

DETAILED DESCRIPTION

Figure 1:
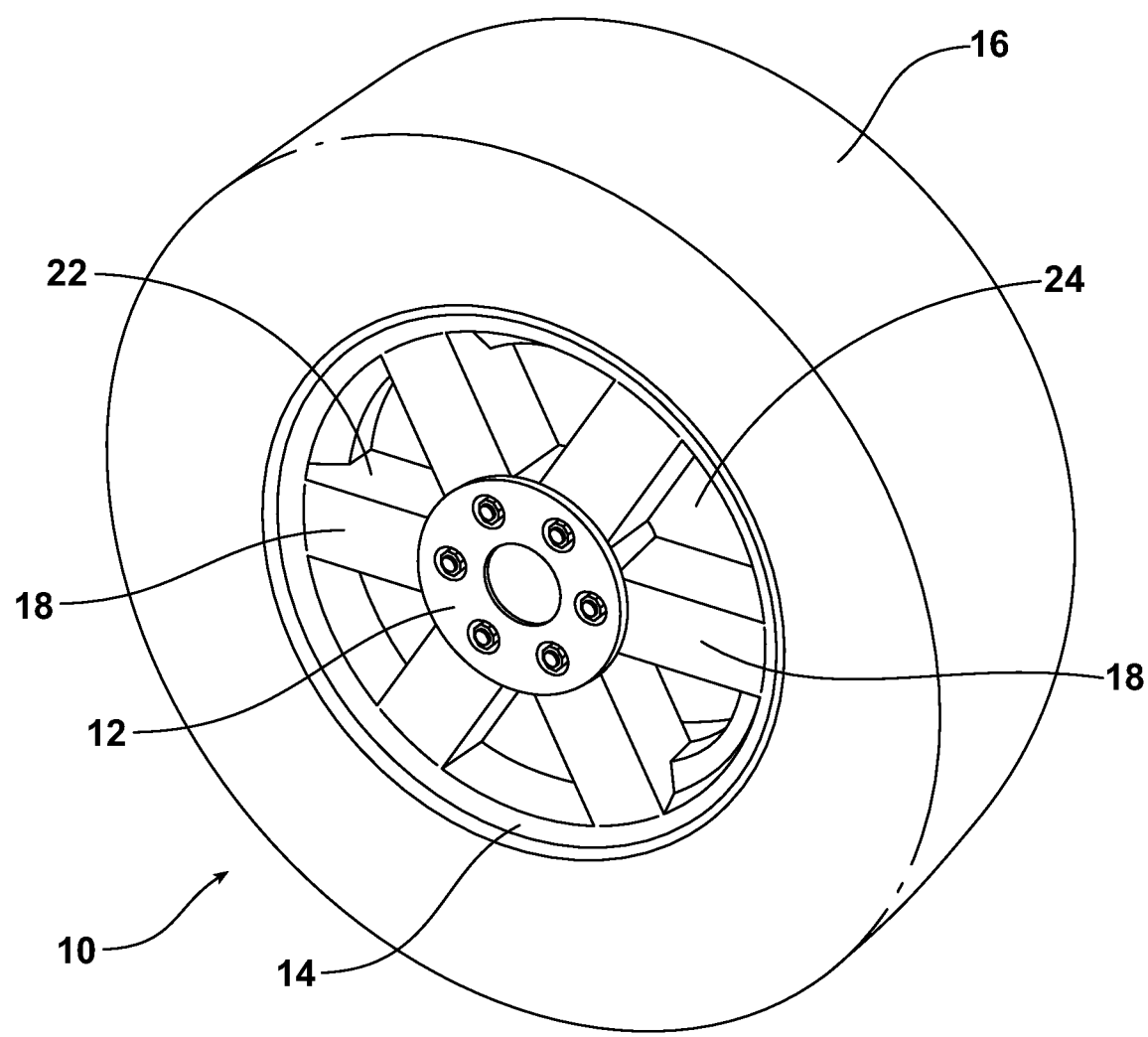
FIG. 1 is a perspective view of a wheel that is the subject matter of this document.
Figure 2:
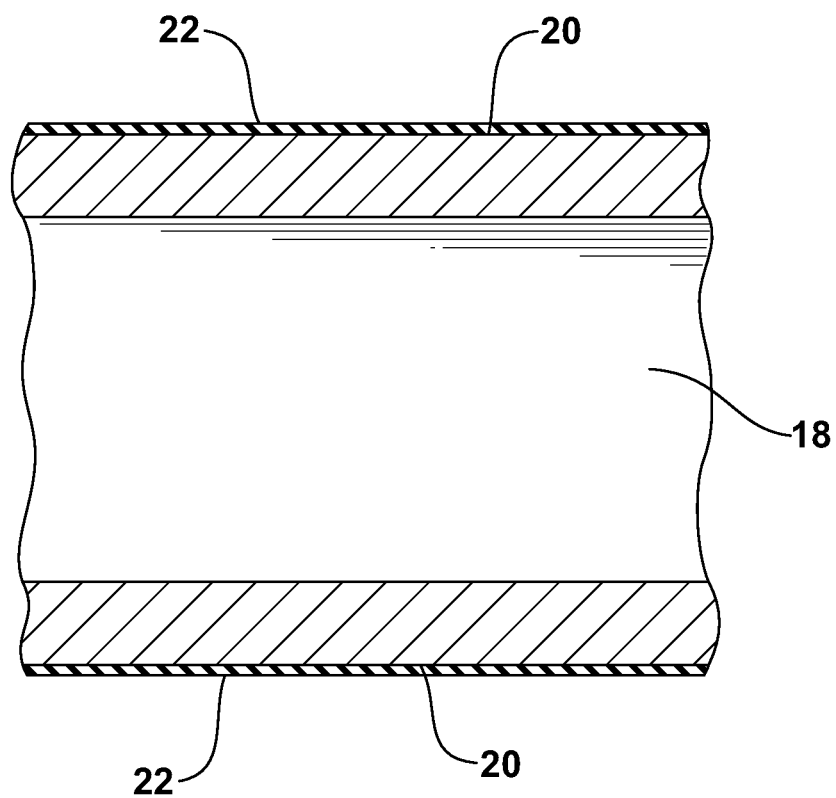
FIG. 2 is a cross sectional view through a spoke of the wheel illustrated in FIG. 1 showing the integral step having a slip resistant surface.

Reference is now made to FIGS. 1 and 2 illustrating a first embodiment of a wheel 10 for a motor vehicle. As illustrated, the wheel 10 includes a hub 12 and a rim 14 adapted to hold a tire 16. A plurality of spokes 18 extend between the hub 12 and the rim 14. At least one and preferably all of the spokes 18 include an integral step 20 having a slip resistant surface 22.

The slip resistant surface 22 is designed and engineered to yield an increased coefficient of friction when engaged with the sole of a shoe such as would occur when an individual places his shoed foot in the opening 24 between two spokes 18, engages the integral step 20, bringing the sole of the shoe into contact with the slip resistant surface 22, and raises his body vertically up from the ground in order to improve his access to an item in the cargo bed or on the rooftop of the motor vehicle to which the wheel is connected. More specifically, the opening or space 24 provided between adjacent spokes is designed to allow a predetermined size boot to be centered on a lower spoke and articulated through a climbing angle without contacting an upper spoke of the two, adjacent spokes.

In the embodiment illustrated in FIGS. 1 and 2, the slip resistant surface 22 comprises a skid resistant liner (particularly FIG. 2). The skid resistant liner 22 may be made from a grippy polymer material such as manufactured and sold under the trademark Rhino TuffGrip™ by Rhino Linings Corporation.

Figure 3:
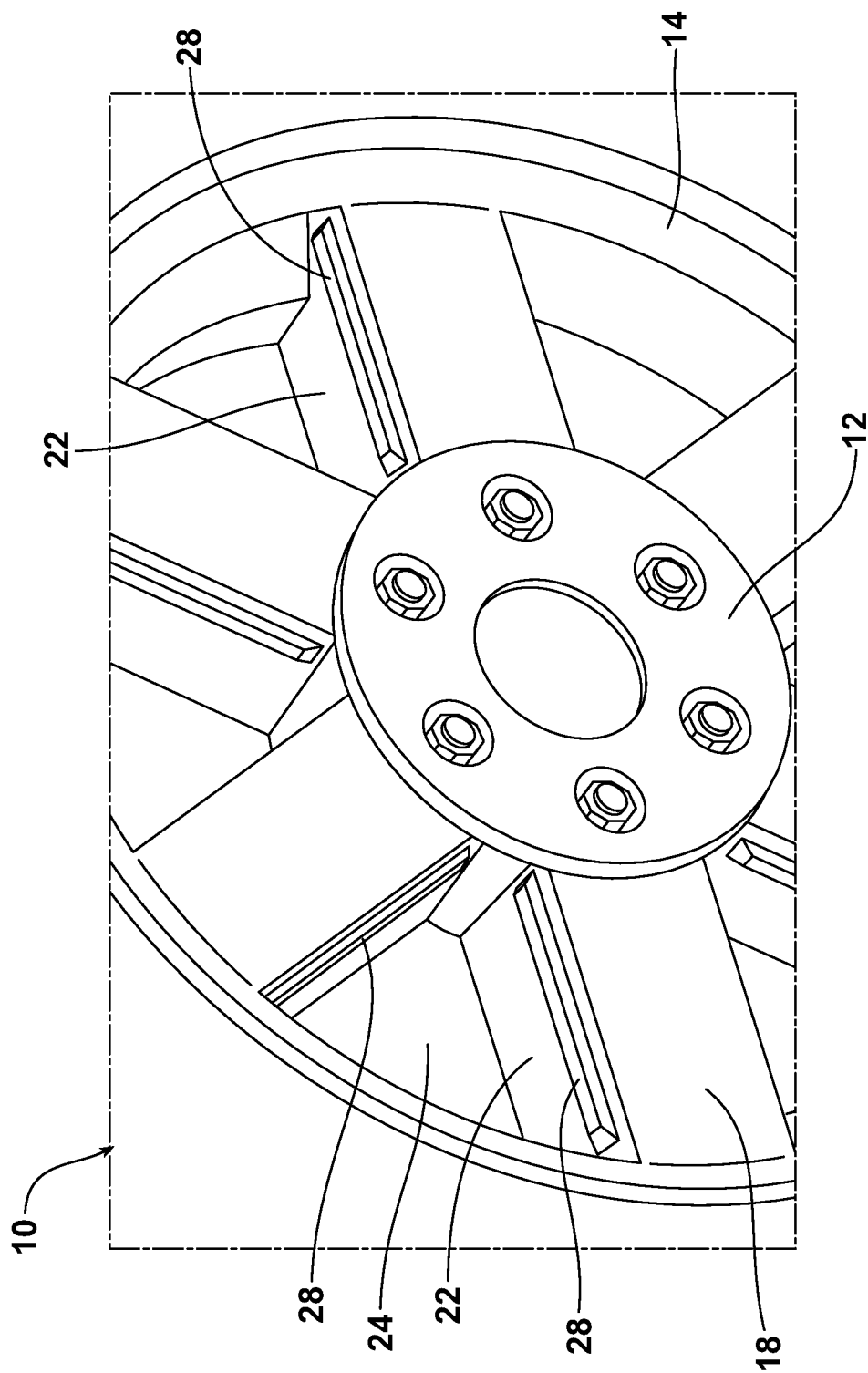
FIG. 3 is a detailed perspective view of an alternative embodiment of a wheel incorporating a spoke with a slip resistant surface including a raised lip and a skid resistant liner.

In an alternative embodiment illustrated in FIG. 3, the slip resistant surface 22 comprises a raised lip 28. Of course, the slip resistant surface 22 of this embodiment may also comprise a skid resistant liner.

Figure 4:
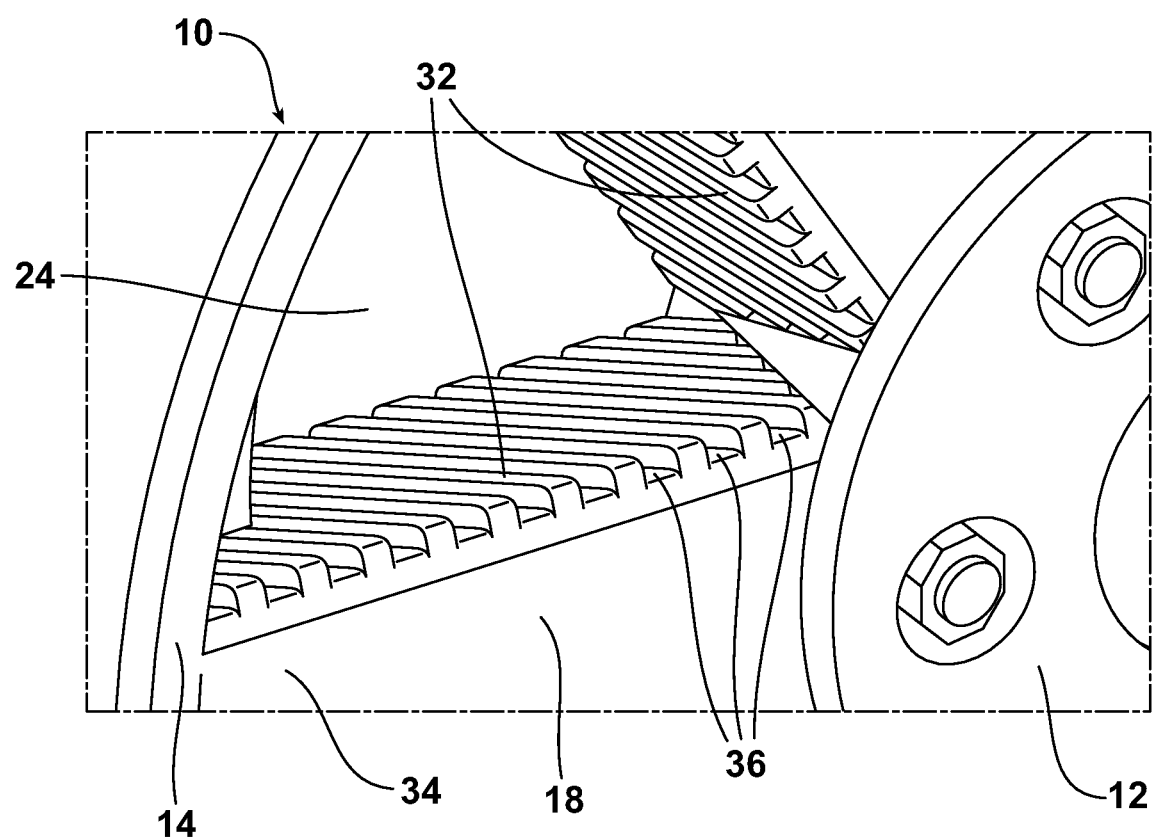
FIG. 4 is a detailed perspective view illustrating yet another embodiment of the wheel incorporating a spoke with a slip resistant surface including corrugations and air channels for directing air to a brake assembly associated with and adjacent to the wheel.

In yet another embodiment illustrated in FIG. 4, the skid resistant surface 22 includes a series of corrugations 32. In the illustrated embodiment, those corrugations 32 are on a bias or are oriented at a diagonal with respect to the front face 34 of the spoke 18.

As further illustrated in FIG. 4, those corrugations 32 include a plurality of channels 36 that are oriented to direct air outwardly from the hub 12 toward the rim 14 as the air travels inwardly across the spokes 18 from the front face 34 of the spokes. Thus, the air is directed inwardly to provide extra cooling for the vehicle brake assembly (not shown) that is located adjacent to/inside the wheel 10.

As should be further appreciated, the wheel 10 facilitates a method of improving access to a cargo bed or rooftop of a motor vehicle. That method may be broadly described as comprising the step of equipping the motor vehicle with at least one wheel 10 including a spoke 18 wherein the spoke has an integral step 20 with a slip resistant surface 22.

In one possible embodiment, the method includes providing the slip resistant surface 22 with a raised lip 28. In another possible embodiment, the method includes providing the slip resistant surface 22 with a skid resistant liner. In yet another embodiment, the method includes providing the slip resistant surface 22 with both a raised lip 28 and a skid resistant liner.

In yet another possible embodiment, the method includes providing the slip resistant surface 22 with corrugations 32. In one possible embodiment the method includes providing those corrugations 32 on a bias or at a diagonal with respect to a front face 34 of the spoke 18. In still another embodiment the method includes directing air toward a brake of the motor vehicle by means of air channels 36 in the corrugations 32.

Still further, the method may also include the step of providing the wheel with a number of spokes, a spoke thickness, a spoke depth and an angle along that spoke depth designed so as to allow a predetermined size boot to be: (a) centered on lower of two adjacent spokes and (b) articulated through a climbing angle without contacting an upper spoke of two adjacent spokes.

In any of the embodiments disclosed, the wheel 10 provides a number of benefits and advantages. By providing one or more spokes 18 of the wheel 10 with an integral step 20 having a slip resistant surface 22, it is possible to provide an operator with more convenient access to items in a cargo bed or on the rooftop of the vehicle. Advantageously, this is accomplished while maintaining an aesthetically pleasing design and avoiding any moving parts which could fail and/or cause wheel imbalance issues. Further, it should be appreciated that the integral step 20, including any raised lip 28 or corrugations 31 and channels 36 are self-cleaning as the rotational speed of the wheel increases with increased vehicle speed. More specifically, dirt and debris are flung off of the wheel 10 and do not cause imbalance.

The foregoing has been presented for purposes of illustration and description. It is not intended to be exhaustive or to limit the embodiments to the precise form disclosed. Obvious modifications and variations are possible in light of the above teachings. For example, the slip resistant surface 22 of the integral step 20 may include a tread pattern of nubs, ridges or any other design adapted to engage and provide grip with the lugs provided on tennis shoes and boots worn by a vehicle operator. All such modifications and variations are within the scope of the appended claims when interpreted in accordance with the breadth to which they are fairly, legally and equitably entitled.

What is claimed:

1. A motor vehicle wheel, comprising:
    a hub;
    a rim; and
    a plurality of spokes extending between said hub and said rim wherein at least one spoke of said plurality of spokes includes an integral step having a slip resistant surface, wherein said slip resistant surface includes a skid resistant liner and a raised lip.

2. The wheel of claim 1, wherein said slip resistant surface yields an increased coefficient of friction with a sole of a shoe.

3. The wheel of claim 1, wherein a space is provided between two spokes so as to allow a predetermined size boot to be centered on a lower spoke of said two spokes and articulated through a predetermined climbing angle without contacting an upper spoke of said two spokes.

4. A motor vehicle including said wheel of claim 1.

5. A method of improving access to a cargo bed or rooftop of a motor vehicle, comprising:
    equipping the motor vehicle with at least one wheel including a spoke wherein said spoke has an integral step with a slip resistant surface; and
    providing said slip resistant surface with a skid resistant liner and a raised lip.

6. The method of claim 5, including providing said wheel with a number of spokes having a thickness, a depth and an angle along said depth designed so that a predetermined size boot may be centered on a lower spoke and the boot may articulate through a climbing angle without contacting an upper spoke.

\* \* \* \* \*